United States Patent [19]

Hultermans

[11] Patent Number: 5,459,806
[45] Date of Patent: Oct. 17, 1995

[54] FIBRE OPTIC FERRULE HAVING AN ASYMMETRICAL CHAMFERED LEAD-IN EDGE

[75] Inventor: Antonius P. C. M. Hultermans, Tilburg, Netherlands

[73] Assignee: The Whitaker Corporation, Wilmington, Del.

[21] Appl. No.: 229,477

[22] Filed: Apr. 15, 1994

[30]   Foreign Application Priority Data

May 18, 1993 [GB] United Kingdom .................... 9310231

[51] Int. Cl.$^6$ ..................................................... G02B 6/36
[52] U.S. Cl. .............................. 385/85; 385/78; 385/84; 385/66
[58] Field of Search ................................. 385/60, 61, 66, 385/67, 78, 79, 84, 85

[56]           References Cited

U.S. PATENT DOCUMENTS

| | | | |
|---|---|---|---|
| 4,978,193 | 12/1990 | Tomita | 385/55 |
| 5,062,682 | 11/1991 | Marazzi | 385/85 |
| 5,066,094 | 11/1991 | Takahashi | 385/73 |
| 5,140,660 | 8/1992 | Takahashi | 385/79 |
| 5,245,684 | 9/1993 | Terao et al. | 385/78 |

FOREIGN PATENT DOCUMENTS

| | | | |
|---|---|---|---|
| 0529939 | 3/1993 | European Pat. Off. | G02B 6/38 |
| 4020528 | 1/1992 | Germany | G02B 6/26 |
| 2257264 | 1/1993 | United Kingdom | G02B 6/36 |

*Primary Examiner*—Frank Gonzalez
*Attorney, Agent, or Firm*—Eric J. Groen; Driscoll A. Nina; Timothy J. Aberle

[57]             ABSTRACT

A fiber optic ferrule is provided with a fiber core mounted within the axial centerline of the ferrule, and the end face of the fiber ferrule has a chamfered lead in edge. The ferrule also has an end face which is offset from the axial centerline by an angle β. The chamfered lead-in edge has edges proportionately angled such that the distance from the vertex of the polished end face to diametrically opposed edges of the convex surface are equal.

8 Claims, 4 Drawing Sheets

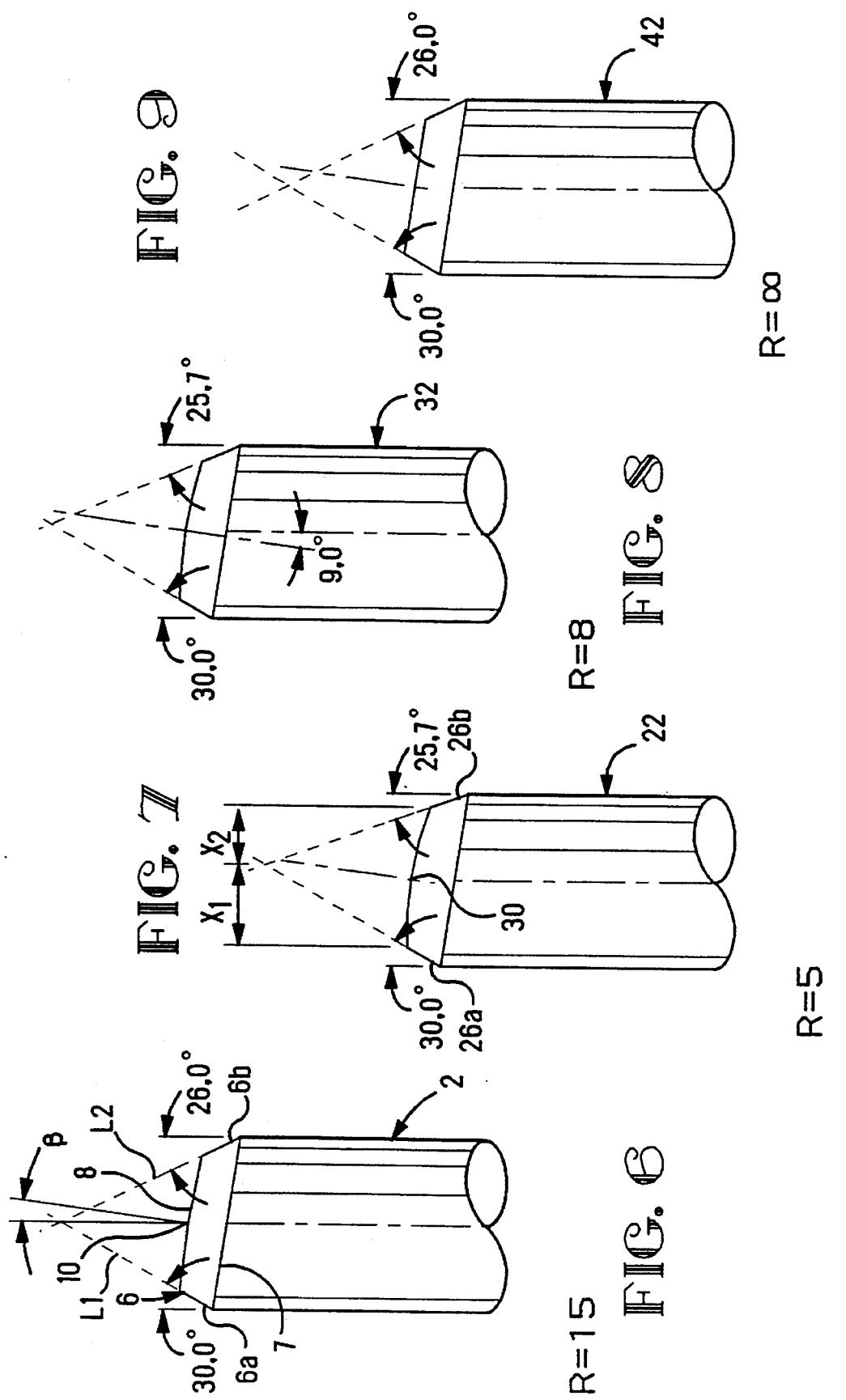

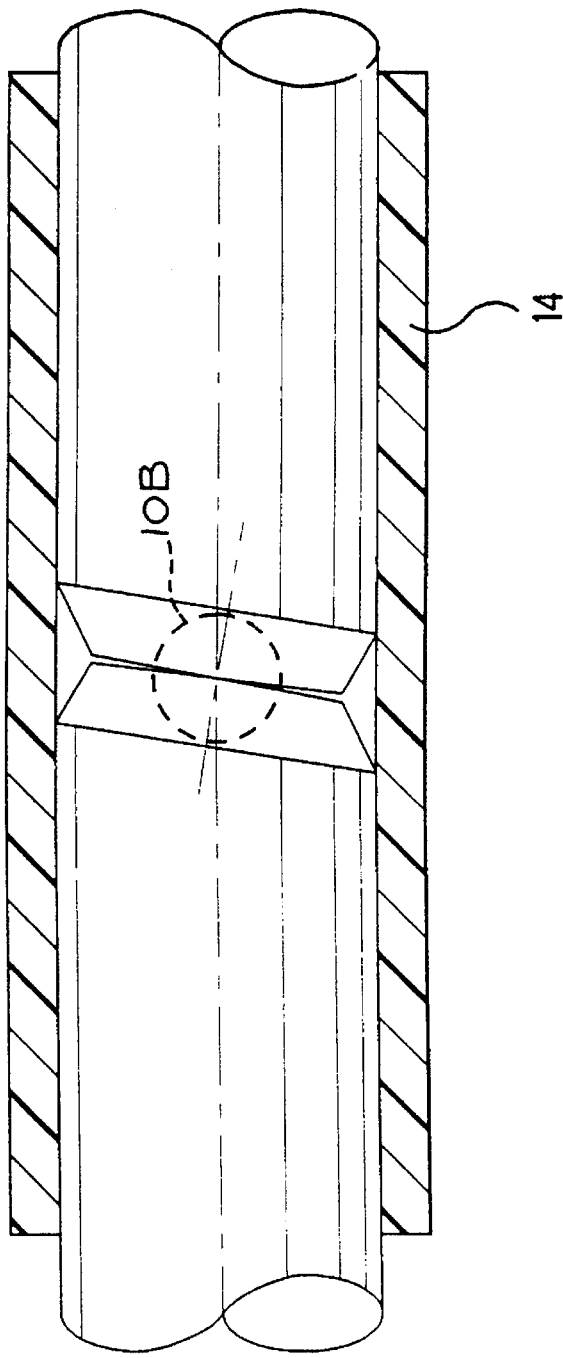
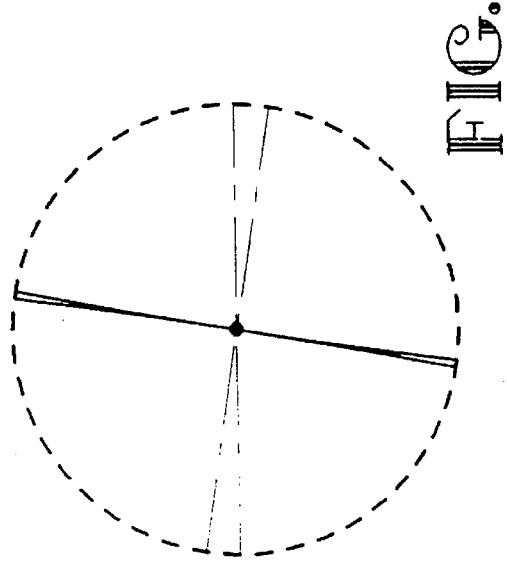
FIG. 10A
FIG. 10B

FIBRE OPTIC FERRULE HAVING AN ASYMMETRICAL CHAMFERED LEAD-IN EDGE

BACKGROUND OF THE INVENTION

1. Field of the Invention

The subject of the invention relates to an Optical Fibre Connector, and more particularly to the ferrule which holds the optical fibre.

2. Description of the Prior Art

Optical fibre connectors are typically comprised of a fibre core coaxially positioned in a ferrule, which is then retained in an outer housing or sleeve. Generally, a latching mechanism retains two fibers or a fibre and an electronic component in electrical engagement. Typical examples include a bayonet style ring, or a plastic outer housing having a resilient latching system.

The composition of a ferrule is typically chosen depending on the application for which the fibre connectors are used, and more particularly by the optical quality of the system. For example, for a system requiring high return loss, the ferrule is typically comprised of ceramic or metal, but in other systems for example in automotive sensors where a low return loss is adequate, the ferrules can be comprised of a plastic molded ferrule. In any event, the optical quality of the system is a function of the axial alignment of the fibre ends as well as how well the fibre ends butt together.

With reference to FIG. 1, a well known prior art system is shown schematically where two ferrules having a chamfered leading edge is provided and where the end face of the ferrule is flat, that is perpendicular to the axial direction. The fibres would be located in an aperture along the centerline of the ferrules such that when the two ferrules butt together, the two fibre end faces are also butted one against the other. In a system such as that shown in FIG. 1, where the ferrules are comprised of a ceramic material, it is common to place the fibre within the ferrule, adhesively fix the fibre within the ferrule and grind the end face to provide a smooth polished surface. This provides the best butting engagement between the end faces as well as provides a highly polished fibre face to prevent light loss.

With reference now to FIG. 2, a later prior art system is shown where two ferrules are shown having a radiused end face, again where a fibre would be inserted within an aperture of the ferrule, wherein the convex surface at the end race provided precision abutment of the two ferrules along the centerline of the ferrules. This type of system prevents the two ferrules from butting together at any other location than at the axial centerline where the fibres are.

With respect now to FIG. 3, it is also known to offset the end face of the ferrule by an angle α where this angle is usually between 7°–15°. The reasoning behind such an angled offset is to improve the return loss in the fibre system. While the offset has improved the return loss, a further problem is caused when the ferrule also requires a chamfered outer edge.

As the surface is polished, the vertex of the convex surface CS is transferred to a position V as best shown in FIG. 3 while the centerline of the fibre end face remains along the centerline of the ferrule at F. Such ferrules and fibres are polished by pressing the ferrule and fibre together against a grinding medium such that the ferrule and fibre are held at an angle relative to the grinding medium, thereby causing the offset angle. The problem results in that, when grinding, the high point of the convex surface is located at the vertex. This is due to the fact that the polishing medium "finds" its own center, and that center is the geometric center of the convex surface. Theoretically, if two ferrules could be polished identically, the two would butt together at the centerline of the ferrules.

However, in practice, the difficulty occurs in that no two ferrules can be polished identically the same, such that in one case a ferrule may be polished as shown in FIG. 3, while the next ferrule is polished as shown in FIG. 4. It should be noted that the ferrule of FIG. 3 is polished further down than that of FIG. 4. The more material that is taken off the end face of the ferrule, the further the vertex of the convex surface formed is offset, such that d1 in FIG. 3 is greater than d2 in FIG. 4. While these distances are small, when these two ferrules are butted one against the other, as shown in FIG. 5 the ferrules do not butt together at the centerline of the fibres, but rather at a position offset from the centerline of the fibres as shown in the exploded view of FIG. 5 causing separation of the fibre end faces by a distance "x".

U.S. Pat. No. 5,140,660 to Seiko Giken addresses this common problem, and in an attempt to solve this problem, configures a ferrule with a front cylindrical tip extending forward from the remainder of the body portion of the ferrule. The chamfered section is located on the main body portion and the only portion which is ground to a convex surface at an offset angle is the very tip portion. While this system overcomes the problem of the ferrules being mismatched as shown in FIG. 5, the portion of the fibre extending forward in the tip of the ferrule is unsupported by the associated alignment sleeve, and could itself lead to fibre misalignment.

SUMMARY OF THE INVENTION

An object of the invention then is to provide an optical fibre system, and more particularly an optical fibre ferrule having a convex surface which is angularly offset from the centerline of the ferrule, but where the vertex of the convex surface is centrally located with the fibre end face.

The objects of the invention have been accomplished by providing a fibre optic ferrule containing a fibre core therein, where the ferrule has a front face which is angularly offset by an acute angle. The ferrule is characterized in that the ferrule has an asymmetrical chamfered lead-in edge, providing different lead-in angles at diametrically opposing sides, such that the distance from the vertex of the front face to the outer perimeter of the front face is equidistant at the opposing sides and coincident with the fibre centerline at the front face.

BRIEF DESCRIPTION OF THE DRAWINGS

FIGS. 6–9 show alternate embodiments of the present invention having various radii of curvature of the end face.

FIGS. 10A and 10B show two fibres according to the present invention in butting relation where the exploded view shows that the ferrules butt together at the centerline of the fibre cores.

DETAILED DESCRIPTION OF THE PREFERRED EMBODIMENT

Figure 1:
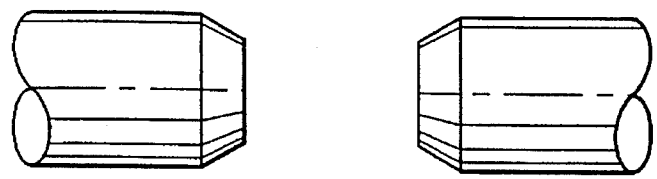
FIG. 1 is a prior art system showing a flat end face on the ferrule and no angular offset.
Figure 2:
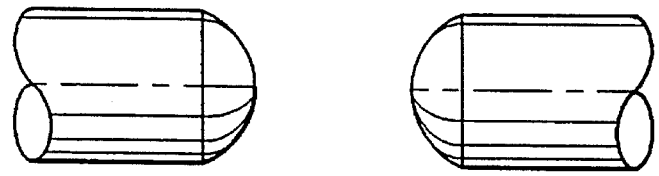
FIG. 2 is a prior art view showing two ferrules having convex end faces.
Figure 3:
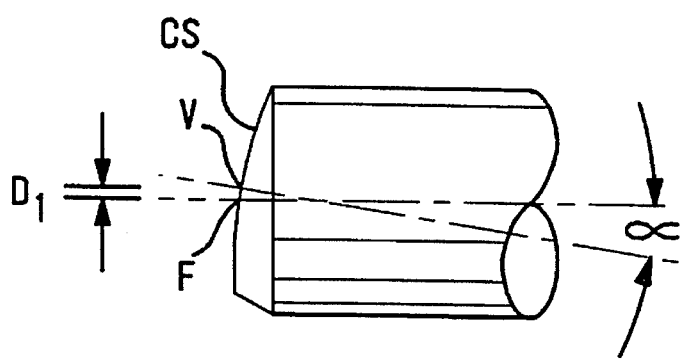
FIGS. 3 and 4 show prior art ferrules having a chamfered outer edge on the ferrule, a convex polished surface, where the polished surface is offset relative to a centerline of the fibre ferrule.
Figure 4:
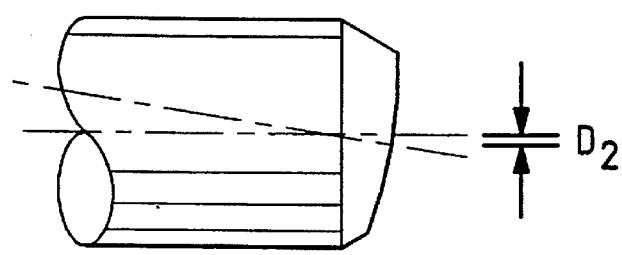
Figure 5A:
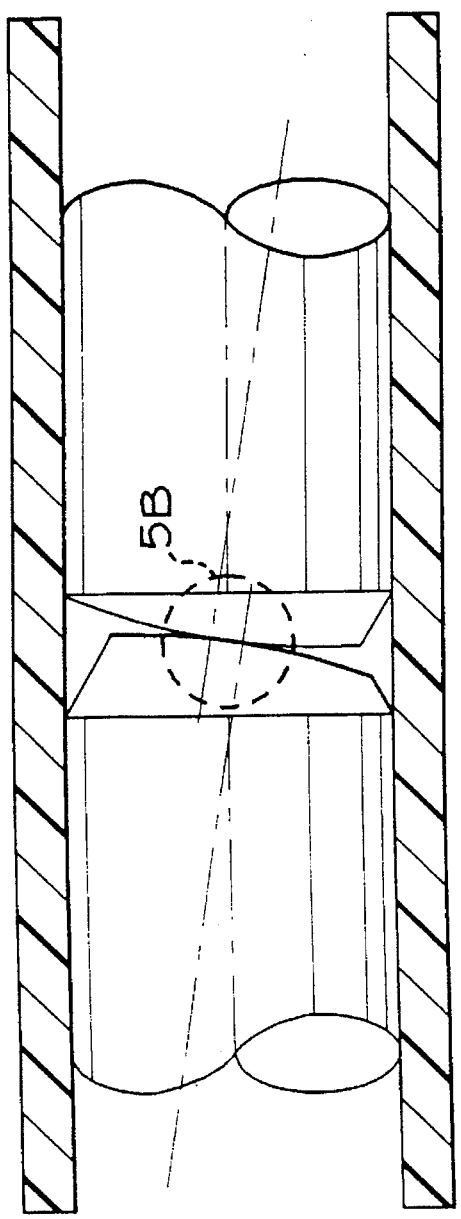
FIGS. 5A and 5B are views showing the misalignment between the ferrules 3 and 4.
Figure 5B:
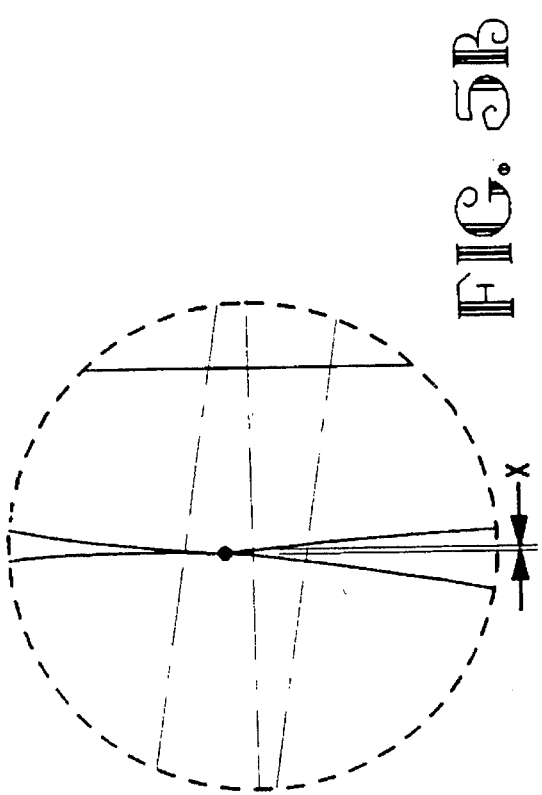

With respect first to FIG. 6, a fibre ferrule is shown at 2 comprising a fibre 4 where the end of the ferrule has a chamfered lead-in surface 6 and a convex surface 8. In the embodiment shown in FIG. 6, the convex end face 8 has a radius of curvature of 15 mm where the convex surface is offset from the centerline of the fibre ferrule by an angle $\beta$. As mentioned above, this angle $\beta$ typically ranges from 7°–15°. In the embodiment shown in FIG. 6, $\beta$ has a value of 9°.

As also shown in FIG. 6, the ferrule chamfered surface 6 is asymmetrically chamfered, such that the chamfered surface has different lead-in angle components 6a and 6b; where for the geometry chosen in FIG. 6, where $\beta=9°$, those components are 6a=30°, and 6b=26°. As shown in FIG. 7, the asymmetrical chamfer surfaces 26a, 26b define a convex surface such that, the distances $x_1$ and $x_2$, from the vertex 30 to diametrically opposed perimeter edges are equal, while at the same time, maintaining the vertex 30 coincident with the fibre centerline at the front face. This remains constant regardless of how much ferrule material is ground from the end face, so long as the offset angle remains the same.

FIGS. 7 and 8 show ferrules 22 and 32 respectively having different radii of curvature at the front convex surface, as well as the necessary geometry of the chamfered lead-in edge. FIG. 9 shows the necessary configuration for a ferrule having an offset end face but where the end face is flat.

As shown in FIG. 10, two fibres terminated within ferrules similar to that of FIG. 6 are shown terminated within an alignment sleeve 14. As shown in the exploded view, the two ferrules are physically contacting at the exact centerline of the fibres thereby ensuring maximum light transmission between the two fibres.

In the preferred embodiment of the invention, the ferrules 2, 22, 32 or 42 (FIGS. 6–9) are comprised of a ceramic material. This material could be extruded or moulded into a configuration comprising the cylindrical shape required for the ferrule. The chamfered lead-in edge 6 could be formed by grinding, or it could also be produced by other means, for example by initially moulding the lead-in edge into the ceramic ferrule. It should also be appreciated that the invention is useable with various radii of curvature of the convex end face, as well as with various offset angles $\beta$ (FIG. 6) of the end face. It is further anticipated that the invention is also useable with other ferrule materials such as metal or plastic.

Advantageously then, the above mentioned invention provides for an optical fibre ferrule and a method of producing the same, where a fibre ferrule can include a chamfered lead-in edge, and where the end face of the ferrule can be offset relative to the axial centerline of the fiber ferrule, yet maintain the vertex of the ferrule end face coincident with the centerline of the ferrule and fibre. Also advantageously, this vertex is maintained at the centerline of the ferrule and fibre regardless of the degree of grinding or polishing of the end face. This provides that if the end face of the ferrule or fibre are damaged, the end face of the ferrule can be further polished, removing the damaged material, and yet maintain perfect light transmission qualities with the mating fibre and ferrule.

I claim:

1. A fiber optic ferrule containing a fiber core therein and defining a longitudinal axis therethrough, the ferrule comprising a front face which is angularly offset by an acute angle relative to the longitudinal axis, the ferrule being characterized in that the ferrule has an asymmetrical chamfered lead-in edge extending outward and rearward from the front face, the chambered lead-in edge providing different lead-in angles with respect to the longitudinal axis at diametrically opposing sides, such that the distance from the center of the front face to the outer perimeter of the front face is equidistant at the opposing sides and the center of the front face is coincident with the fibre centerline at the front face.

2. The fibre optic ferrule of claim 1, characterized in that the front face is flat.

3. The fibre optic ferrule of claim 1, characterized in that the front face is convex and the vertex of the convex surface is coincident with the fibre centerline at the front face.

4. The fibre optic ferrule of claim 1, characterized in that fibre optic ferrule includes a ferrule body and where the lead-in surface extends rearward and outward such that the intersection of the chamfered surface and the ferrule body is substantially parallel to the acute angle offset of the front face.

5. A method of polishing a fibre optic ferrule having a ferrule body with an end face, a leading edge about the end face and a longitudinal axis therethrough, characterized by the steps of:

asymmetrical chamfering the leading edge of the ferrule to form a lead-in edge having different lead-in angles relative to the longitudinal axis at diametrically opposing sides of the ferrule have different angular values; and subsequently polishing the end face of the ferrule such that the end face of the ferrule is angularly offset between the diametrically opposing sides.

6. The method of claim 5, characterized in that the front end face is flat.

7. The method of claim 5, characterized in that the front end face is convex.

8. A fibre optic connector comprising an outer housing together with a ferrule having a longitudinal axis, the ferrule having a fibre core axially positioned therein, an end mating face of the ferrule being angularly offset relative to an axial centerline of the ferrule, the connector being characterized in that the ferrule has an asymmetrical frusto-conical chamfered lead-in edge extending rearward and outward from the end mating face, with an axial centerline coincident with the axial centerline of the ferrule at the front face.

* * * * *

UNITED STATES PATENT AND TRADEMARK OFFICE
CERTIFICATE OF CORRECTION

PATENT NO. : 5,459,806
DATED : October 17, 1995
INVENTOR(S) : Antonius P.C.M. Hultermans It is certified that error appears in the above-indentified patent and that said Letters Patent is hereby corrected as shown below:

IN THE CLAIMS:
Column 4:
    Claim 1, line 16, "chambered" should be --chamfered--.

Signed and Sealed this

Thirtieth Day of April, 1996

Attest:

BRUCE LEHMAN

Attesting Officer            Commissioner of Patents and Trademarks